April 28, 1970      C. C. LEE      3,508,358

FISHTRAP

Filed July 24, 1969      2 Sheets-Sheet 1

INVENTOR.
CHRISTOPHER C. LEE

BY J. M. Carson, Jr.
ATTORNEY

April 28, 1970  C. C. LEE  3,508,358
FISHTRAP

Filed July 24, 1969  2 Sheets-Sheet 2

INVENTOR.
CHRISTOPHER C. LEE

BY *J. M. Carson, Jr.*

ATTORNEY

United States Patent Office 3,508,358
Patented Apr. 28, 1970

3,508,358
FISHTRAP
Christopher C. Lee, 1056 Kane St., Norfolk, Va. 23513
Continuation-in-part of application Ser. No. 734,909,
June 6, 1968. This application July 24, 1969, Ser.
No. 844,588
Int. Cl. A01m 23/16, 23/02; A01k 69/10
U.S. Cl. 43—60                                    10 Claims

ABSTRACT OF THE DISCLOSURE

A fishtrap including a trap body assembly having a wire mesh closed upper surface and sides having wire mesh closed upper portions, as well as a trap door carriage assembly having a wire mesh covered frame vertically moveable between a trap closing upper position and a lower position. Springs normally maintain the trap door carriage assembly frame in its upper position, and the trap is also provided with a trigger mechanism including a releaseable latch device for overriding the action of the springs and maintaining the trap door carriage assembly frame in its lower position as well as means for closing an electrical circuit to a signal device when bait placed in the trap is disturbed for warning the trap user to remotely manually release the latch device, or to energize an electric motor to perform this operation. The trap further includes an electrical signal device for indicating the closing thereof, as well as electrical means for producing a light and sounds therein. Alternate sources of electrical energy for operating the trap systems are also provided.

---

This application is a continuation-in-part of my now abandoned copending application, Ser. No. 734,909, filed June 6, 1968.

This invention relates generally to a trap for taking fish or the smaller animals, and more particularly to a trap of this type either remotely manually operable or automatically electrically operable.

Traps for fish or small animals known heretofore generally include a box-like or similar enclosure having an open side or other entrance opening, within which bait is conneced to a suitable trigger mechanism. When a fish or a small animal attempts to devour the bait the trigger mechanism is actuated, which releases a trap door to move under the influence of spring means or the like to close the opening to the trap, thereby penning the fish or animal therein. While such known traps may operate quite well in attaining the contemplated results, one of their major drawbacks is the relatively limited use which may be made thereof, arising from the necessity of leaving the baited trap for a period of time before returning to discover if it has been sprung. Quite often, such a tray may be sprung soon after it has been baited and left, and thereafter stays inoperative until the user returns to remove the trapped fish or animal and again place it in operating condition. The trap forming the subject matter of the present invention, however, is deemed to adequately overcome this and other drawbacks of such prior art devices, and to fill a need not completely satisfied by the prior art.

Accordingly, an object of the present invention is the provision of a trap manually operable from a remote point in response to an electrical signal transmitted thereto upon actuation of a trap trigger mechanism electrical circuit closing component.

Another object of the instant invention is the provision of a trap which further may be automatically operated upon actuation of the trigger mechanism electrical circuit closing component thereof and including means for actuating an electrically operated signal device disposed at a remote point to indicate the springing of the trap to the user.

A further object of the present invention is the provision of a trap selectively manually operable from a distance in response to an electrical signal transmitted therefrom or automatically electrically operable, including electrically energized means for audibly and optically attracting fish or the smaller animals thereto.

According to the instant invention, the foregoing and other objects are attained by providing a trap having a box-like trap body assembly including a wire mesh carrying frame to which a wire mesh or screen material is secured to cover the upper surface and about the upper halves of three of the four sides thereof; the corresponding area of the fourth side thereof being covered by the wire mesh or screen material and by a trap side door. The trap further includes a trap door carriage assembly having a lower surface defined by a horizontally disposed frame section covered by a wire mesh or screen material; the trap door carriage assembly being reciprocally vertically moveable between a position in which the frame section thereof is disposed adjacent the lower extremity of the wire mesh covered upper portions of the side walls of the trap body assembly, and a position in which it is disposed adjacent the lower extremity of the trap body assembly. Helical tension springs interconnecting the trap body assembly and the trap door carriage assembly normally maintain the trap door carriage assembly at the upper limit of the range of travel thereof. The trap is also provided with a trigger mechanism operable when a fish or an animal attempts to devour bait placed within the trap to close an electrical circuit which warns the remotely situated user of the trap thereof, permitting him to manually release a latch device holding the trap door carriage assembly at the lower limit of its range of travel to allow it to move upwardly to close the trap and secure the fish or animal therein. The closing of the electrical circuit hereinbefore set forth may also be optionally utilized to operate an electric motor to release the latch device and eliminate the necessity for the manual operation thereof. The trap further includes one or more electrical switches operatble to transmit an electrical signal actuating a light to indicate to the user of the trap the closing thereof, as well as means for electrically producing a light and an audible signal within the trap attractive to the fish or smaller animal sought to be taken. The trap further includes alternate sources of electrical power to operate the electrical components thereof.

A more complete appreciation of the invention and many of the attendant advantages thereof will be readily apparent as the same becomes better understood by reference to the following detailed description when considered in connection with the accompanying drawings wherein.

Figure 1:
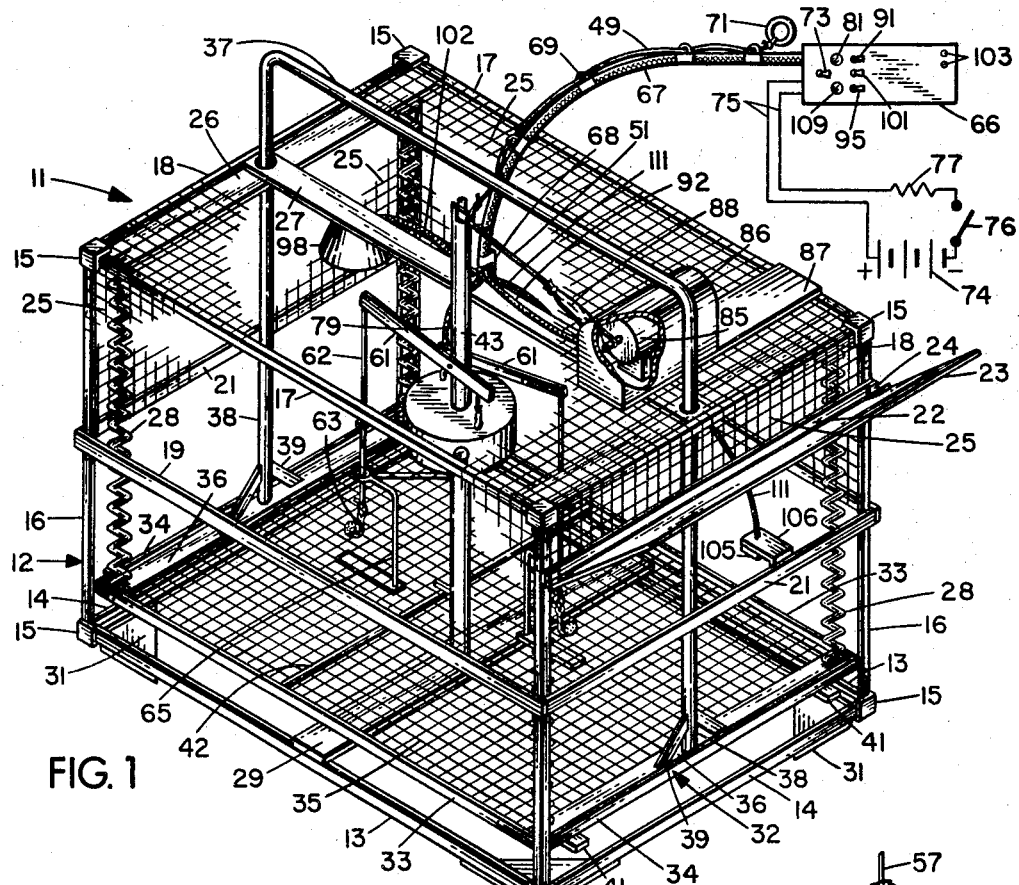
FIG. 1 is a perspective view of the trap with the trap door carriage assembly disposed at the lower limit of the range of travel thereof.
Figure 2:
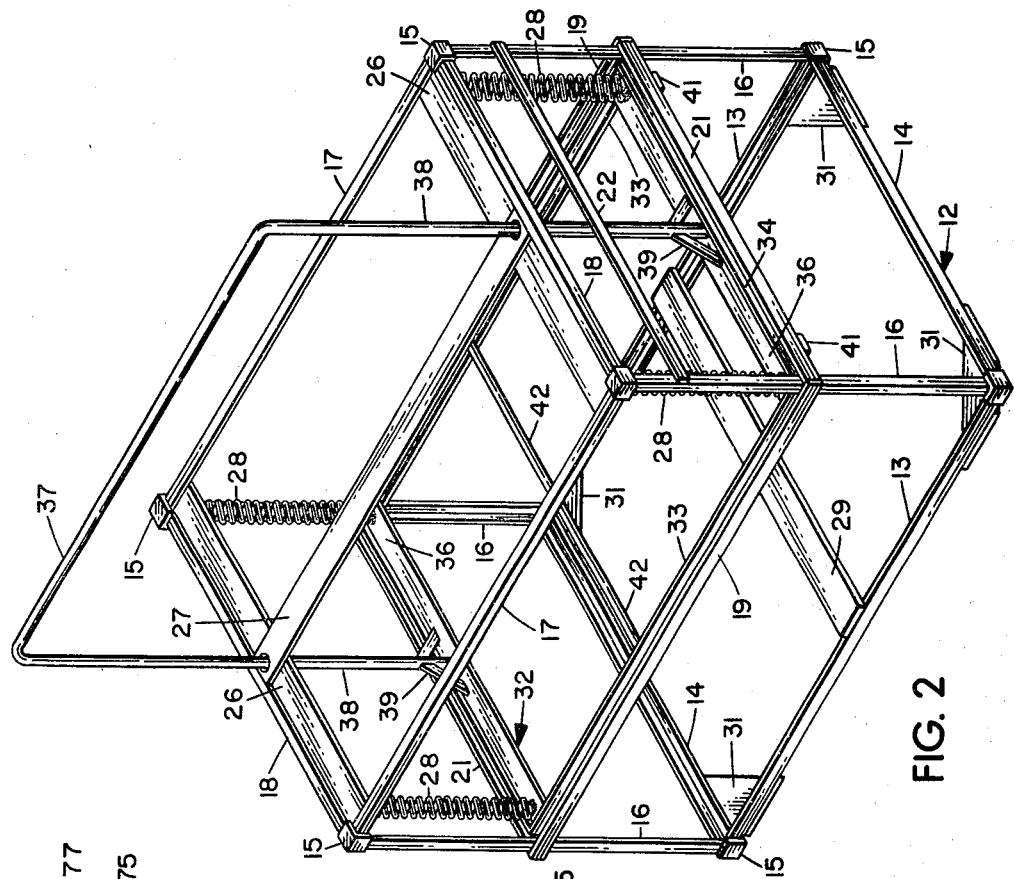
FIG. 2 is a perspective view of the interconnected frames of the trap body assembly and the trap door carriage assembly with the trap door carriage assembly disposed at the upper limit of the range of travel thereof.

Referring now more particularly to the drawings, wherein like reference numerals designate the same or identical parts throughout the several views, and more specifically to FIGS. 1 and 2, there is shown a trap, generally designated by the reference numeral 11. Although trap 11 is primarily intended for underwater use in the taking of fish, and the detailed description thereof set forth hereinafter is drawn to a trap adapted to successfully attain this objective, it is to be clearly understood that the trap 11 may also be utilized above water for taking smaller land animals. Trap 11 includes a trap body assembly, generally designated by the reference numeral 12, having a rectangularly shaped, horizontally disposed, lower frame section defined by the side members 13 and the end members 14, which are formed of metallic angle elements having the outer surfaces of the extremities thereof welded or otherwise suitably secured to the inner surfaces of suitable metallic corner connector elements 15. The trap body assembly 12 also includes a metallic standard 16 extending vertically upwardly from each of the four corners thereof; each standard 16 being formed of an angle element similar to those forming the members 13 and 14 and having the lower extremity thereof secured to a corner connector element 15 similarly to the connection of members 13 and 14 thereto. Trap body assembly 12 further includes an upper frame section defined by the side members 17 and the end members 18 similar, respectively, to the lower frame section side members 13 and end members 14; the extremities of the outer surfaces of side members 17 and end members 18 being suitably secured as by welding or the like to corner connector elements 15, each of which is suitably similarly connected to the upper extremity of a standard 16.

Trap body assembly 12 also includes an intermediate side member 19 disposed between and parallelly to each of the lower frame section side members 13 and the upper frame section side member 17 positioned directly thereabove, as well as an intermediate end member 21 disposed between and parallelly to each of the lower frame section end members 14 and the upper frame section end member 18 positioned directly thereabove. The ends of the intermediate members 19 and 21 are secured to the adjacent standards 16 at about the vertical midpoints thereof. Further, an end rail 22 extends across one end of trap body assembly 12 at a point spaced above and parallelly to an intermediate end member 21; the ends thereof being secured to the adjacent standards 16. End rail 22 carries a trap side door 23 hinged thereto by the hinges 24; the door 23 normally closing the space between end rail 22 and the intermediate end member 21 positioned therebelow but being swingable upwardly, as illustrated in FIG. 1, to permit the user of trap 11 to reach thereinto through this space. Suitable conventional latch elements, not illustrated, may be provided for releasably connecting the lower edge of the door 23 to the intermediate end member 21. A suitable metallic wire mesh or screen material 25, illustrated only in FIG. 1 with parts broken away in the interest of clarity, is utilized in completely closing the upper surface of trap body assembly 12 bounded by the upper frame section side members 17 and end members 18 except as set forth hereinafter, as well as the space extending between each of the upper frame section side members 17 and the intermediate side member 19 positioned therebeneath. The wire mesh or screen material 25 is also utilized in completely closing the space extending between one end member 18 of the upper frame section and the intermediate end member 21 positioned therebeneath, as well as the space extending between the other end member 18 of the upper frame section and the end rail 22 positioned directly therebeneath. The coarseness or gauge of the mesh of material 25, obviously, should not be great enough to permit the passage therethrough of the fish or animals that the user of trap 11 intends to take.

Trap body assembly 12 also includes a fairly wide metallic end bar 26 extending between the side members 17 in close proximity to each of the end members 18 of the upper frame section thereof, as well as a fairly wide metallic longitudinal bar 27 extending between the end members 18 of the upper frame section thereof; the longitudinal bar 27 being equidistantly disposed between and parallelly to the upper frame section side members 17 with each end thereof overlying and being secured to an end bar 26. A vertical bore is formed through each end of longitudinal bar 27 in close proximity to the adjacent end member 18 of the upper frame section of trap body assembly 12; each of these bores also extending downwardly and completely through the underlying portion of an end bar 26 thereof.

A helical tension spring 28 extends vertically downwardly beneath the upper frame section of trap body assembly 12 in the vicinity of each of the standards 16 thereof; the longitudinal axis of each spring 28 being within the space enclosed by the wire mesh or screen material 25. The upper end of each spring 28 is suitably secured, as by welding, to the lower surface of an end bar 26 of the upper frame section of trap body assembly 12, and the length of each spring 28, in the absence of a tensile force applied thereto, is such that the lower extremity thereof is somewhat above the level of the upper edges of the intermediate side members 19 and the intermediate end members 21 of trap body assembly 12.

The lower frame section of trap body assembly 12 further includes a fairly wide metallic transverse bar 29 extending between the side members 13 thereof; transverse bar 29 being equidistantly disposed between and parallelly to the end members 14 thereof. Also, to provide for increased bearing contact between the trap body assembly 12 and the surface upon which it may be placed, such as a layer of bottom mud on a river or lake bed, the lower frame section thereof may include a substantially triangular gusset plate 31 disposed adjacent each of the corners thereof and connected to the lower surfaces of the adjacent ends of a side member 13 and an end member 14 thereof.

Trap 11 further includes a trap door carriage assembly, generally designated by the reference numeral 32, having a lower surface defined by a horizontally disposed trap door frame section having side members 33 and end members 34, which may be metallic angle elements similar to those of which the side members 13 and the end members 14 of the lower frame section of trap body assembly 12 are formed. The side members 33 of the trap door frame section are somewhat shorter than the side members 13 of the lower frame section of the trap body assembly 12 and are disposed similarly thereto, while the end members 34 of the trap door frame section are somewhat shorter than the end members 14 of the lower frame section of the trap body assembly 12 and are disposed similarly thereto. The side members 33 and the end members 34 are suitably connected together to define the periphery of a rectangular frame fairly snugly disposable in the rectangular space bounded by the four vertical standards 16 of trap body assembly 12. A metallic wire mesh or screen material 35 similar to the wire mesh or screen material 25, illustrated only in FIG. 1 and partially broken away therein in the interest of clarity, completely closes the surface of the trap door frame section bounded by the side members 33 and the end members 34 thereof, except as set forth hereinafter.

Trap door carriage assembly 32 is also provided with a fairly wide metallic end bar 36 extending between the side members 33 of the trap door frame section thereof in close proximity to each of the end members 34 of the trap door frame section thereof. The trap door carriage assembly 32 further includes a metallic bar 37 having a substantially straight central section parallelly spaced above the longitudinal bar 27 of trap body assembly 12 and extending a distance substantially equal to the spacing between the bores formed through longitudinal bar 27. Bar 37 further includes a pair of end sections 38 disposed perpendicularly to the central section thereof and extending parallelly vertically downwardly through the bores formed through longitudinal bar 27 and the underlying portions of the end bars 26 of trap body assembly 12; the lower terminus of each end section 38 of bar 37 centrally perpendicularly abutting the upper surface of an end bar 36 of trap door carriage assembly 32 and suitably connected thereto, as by welding. The interconnection of the terminus of each end section 38 of bar 37 to an end bar 36 of trap door carriage assembly 32 may be strengthened, if desired, by the use of suitable bracing elements 39. The length of the end sections 38 of bar 37 is such that they extend upwardly above the longitudinal bar 27 of trap body assembly 12 a predetermined distance when the trap door carriage assembly 32 is at the lower limit of the range of travel thereof, as more fully set forth hereinafter. The vertically downwardly extending helical tension springs 28 each has a lower terminus suitably connected, as by welding, to the upper surface of an end bar 36 of trap door carriage assembly 32. When the trap door carriage assembly 32 is at the upper limit of the range of travel thereof, tensile forces sufficient to normally maintain trap door carriage assembly 32 at this level are applied to the springs 28. The trap door frame section end members 34 of trap door carriage assembly 32 each carry a pair of outwardly projecting elements 41 capable of abutting the lower edges of the trap body assembly intermediate end members 21 for establishing the upper limit of the range of travel of trap door carriage assembly 32. The trap door carriage assembly 32 also includes a transverse rod 42 extending between the side members 33 of the trap door frame section thereof useable, as hereinafter set forth, in maintaining the trap door carriage assembly 32 at the lower limit of the range of travel thereof.

Figures 3, 4:
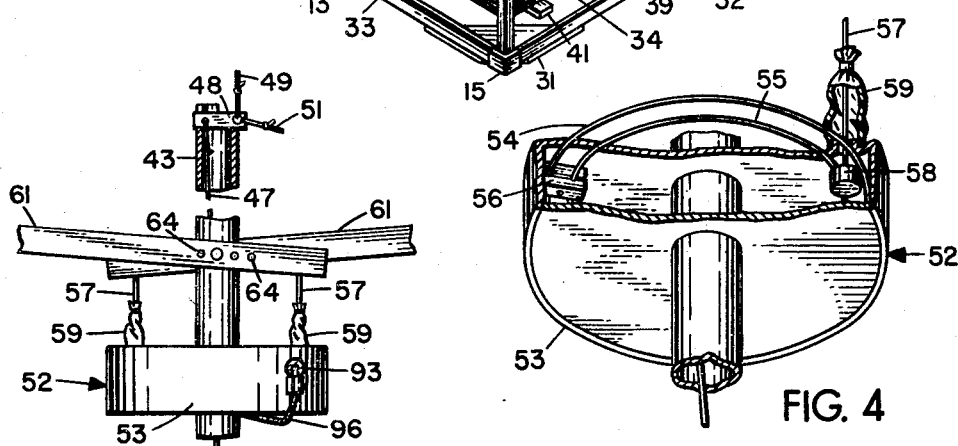
FIG. 3 is a side elevational view, partially in section, of the electrical circuit closing component of the trap trigger mechanism and the latch device and operating linkage therefor retaining the trap door carriage assembly at the lower limit of the range of travel thereof.
FIG. 4 is a perspective view, with parts broken away, showing the interior of the electrical circuit closing component of the trap trigger mechanism; and, FIG. 5 is a schematic diagram of the electrical components of the trap and the circuitry utilized therewith.

Referring now to FIG. 3 as well as to FIG. 1 of the drawings, it will be seen that means for maintaining the trap door carriage assembly 32 at the lower limit of the range of travel thereof includes a metallic tubular element 43 having a lower terminus connected to the upper surface of the transverse bar 29 of the lower frame section of trap body assembly 12 and extending vertically upwardly therefrom through an opening formed through the wire mesh or screen material 35 of the trap door frame section of trap door carriage assembly 32, and thence vertically upwardly through an opening formed through the wire mesh or screen material 25 of the upper frame section of trap body assembly 12. The lower terminus of tubular element 43 may be so positioned with respect to the upper surface of the transverse bar 29 of the lower frame section of trap body assembly 12 that at an upper point tubular element 43 abuts an edge of the longitudinal bar 27 of trap body assembly 12, to which it may be suitably connected. A slot is formed in the cylindrical wall of tubular element 43 near the lower extremity thereof and a latch element 44 is pivotally mounted therein; latch element 44 having a first arm 45 capable of overlying the transverse rod 42 of trap door carriage assembly 32 when it extends horizontally outwardly from the slot formed in the cylindrical wall of tubular element 43, and having a second arm 46 simultaneously capable of extending horizontally into the interior of tubular element 43. A cable 47 extends downwardly into the tubular element 43 from the upper extremity thereof; the lower terminus of cable 47 being connected to the arm 46 of latch element 44 near the free end thereof. It will now be obvious that if the trap door carriage assembly 32 is pushed downwardly to the lower limit of the range of travel thereof, an upwardly directed tensile force may be applied to the cable 47 to swing the free end of the arm 46 of the latch element 44 upwardly, thereby swinging the arm 45 thereof downwardly to overlie and press downwardly against the transverse rod 42 of trap door carriage assembly 32. The transverse rod 42 of trap door carriage assembly 32, under the urging of the expanded tension springs 28, presses upwardly against arm 45 of the latch element 44, requiring the maintenance of a sufficient tensile force in the cable 47 to override the action of the springs 28 when it is desired to maintain trap 11 in its open position. Accordingly, the upper terminus of cable 47 is connected to a link element 48 near a first end thereof; the link element 48 being sufficiently elongated to overlie diametrically opposed points on the open upper edge of the cylindrical wall of tubular element 43. The length of cable 47 is such that, when the link element 48 is disposed as hereinbefore set forth, the arm 46 of latch element 44 is disposed in the position in which it extends horizontally into the interior of tubular element 43, and the upper end of the cable 47 is disposed adjacent the interior surface of the cylindrical wall of tubular element 43. A pair of cables 49 and 51 are also connected to the link element 48 near a second end thereof. A tensile force applied either to cable 49 or 51 will dislodge the link element 48 from the position hereinbefore set forth, permitting the first end thereof to drop downwardly into the interior of tubular element 43 and remove the tensile force maintained in cable 47, thereby allowing the arm 45 of latch element 44 to swing upwardly to release the trap door assembly 32 for upward movement under the urging of the springs 28.

Referring now to FIG. 4 as well as to FIGS. 1 and 3 of the drawings, it will be seen that the trigger mechanism of trap 11 includes an electrical circuit closing component, generally designated by the reference numeral 52, operable, when fish or small animals attempt to devour bait carried by the trap trigger mechanism, as hereinafter set forth, to close an electrical circuit. The electrical circuit closing component 52 includes a cylindrically shaped waterproof housing 53 centrally mounted around tubular element 43 at a point above the level of the intermediate side members 19 and the intermediate end members 21 of trap body assembly 12. A pair of ring elements 54 and 55 having different diameters and composed of an electrically conductive metal are horizontally concentrically disposed within housing 53 at a level somewhat beneath the lower surface of the upper end wall of housing 53; conventional clamp elements 56 composed of an electrically non-conductive ceramic material or the like being utilized in maintaining ring elements 54 and 55 in the position hereinbefore set forth. A pair of flexible cables 57 formed of an electrically non-conductive substance such as gut extend downwardly into the housing 53 through suitable openings formed through the upper end wall thereof and pass between the ring elements 54 and 55 at diametrically opposed points. A weight 58 greater in breadth than the spacing between the ring elements 54 and 55 is attached to the lower terminus of each cable 57; each weight 58 being composed of an electrically conductive metal. Each weight 58 is normally suspended within housing 53 at a level beneath the ring elements 54 and 55, but if a cable 57 is drawn upwardly the weight 58 attached thereto, inasmuch as it cannot pass between the ring elements 54 and 55, touches both of the ring elements 54 and 55 to establish electrical communication therebetween. In order to assure the watertightness of the housing 53, a tubular sleeve element 59 formed of a light, flexible rubber or the like is loosely placed around each of the cables 57 above the housing 53; the lower end of a sleeve element 59 being secured in watertight fashion around the opening into housing 53 through which a cable 57 passes and the upper end of the sleeve element 59 being gathered in and tightly clamped about the cable 57.

The trap trigger mechanism also includes a pair of elongated members 61 pivotally connected in diametrical opposition to the cylindrical surface of tubular element 43 at a level above the electrical circuit closing component 52 thereof. A short length of each element 61 projects beyond the pivot point thereof to overlie one of the openings formed through the upper end wall of the housing 53, and the upper end of the cable 57 passing therethrough is suitably secured to this short length of the element 61. A longer length of each element 61 projects in the opposite direction from the pivot point thereof and carries a downwardly depending cable 62 situated near the free end thereof. A preferably barbless hook 63 is attached to the lower terminus of each cable 62 upon which bait may be placed. The turning moment about the pivot point of an element 61 produced by the short length thereof and the weight 58 suspended therefrom is greater than the turning moment produced about the pivot point by the longer length thereof and the baited hook 63 suspended therefrom. If desired, a plurality of bores 64 may be placed through each element 61; any one of which may be utilized as the pivot point thereof to establish the turning moments therearound hereinbefore set forth.

When the trap door carriage assembly 32 is maintained at the lower limit of the range of travel thereof, as hereinbefore set forth, each baited hook 63 is disposed somewhat above the level of the wire mesh or screen material 35 thereof. In order to assure that water or air currents do not move the cables 62 carrying the baited hooks 63 substantially out of the vertical positioning thereof as set forth hereinbefore, the wire mesh or screen material 35 of trap door carriage assembly 32 further carries a pair of suitable bracket devices 65; each bracket device 65 having a horizontally disposed circular ring portion encircling one of the cables 62 at a level somewhat above the hook 63 attached thereto. When a fish or an animal attempts to devour bait carried by either of the hooks 63, a tensile force is established in the cable 62 attached thereto, drawing the longer length of the element 61 interconnected therewith downwardly and thereby lifting the weight 58 suspended from the short length thereof into contact with the ring elements 54 and 55 to establish electrical communication therebetween.

Trap 11 also includes an electrical control box 66 having a long, flexible, waterproof, electrical conduit 67 extending therefrom towards the trap body assembly 12; the conduit 67 being on the order of up to about fifty feet in length and carrying a plurality of insulated electrical conductors. The terminus of conduit 67 remote from control box 66 is attached to the longitudinal bar 27 of trap body assembly 12 as by a suitable clamp element 68. Conduit 67 also externally carries a plurality of eye elements 69 clamped thereto at spaced intervals along the length thereof, and the cable 49 having a terminus attached to the link element 48, as hereinbefore set forth, passes loosely through each of the eye elements 69 and is thereby disposed along the length of conduit 67 in close proximity thereto; the other terminus of cable 49 being attached to a pull element 71 disposed adjacent control box 66.

A three volt electrical storage battery 72 is disposed within the control box 66 and an electrical toggle switch 73 is mounted thereon for selectively feeding power from the battery 72 into the electrical circuits set forth hereinafter. A twelve volt electrical storage battery 74 may also be placed near the control box 66 and releasably connected thereto in parallel with battery 72 by means of the insulated electrical conductors 75; the conductor 75 extending from the negative pole of battery 74 including an electrical toggle switch 76 for selectively feeding power from the battery 74 into the electrical circuits set forth hereinafter. The conductor 75 including the switch 76 further includes a dropping resistor 77 for reducing the EMF therein from twelve to three volts. It is not contemplated that power will simultaneously be drawn from batteries 72 and 74, meaning that the switch 76 will be open when the switch 73 is closed and that the switch 73 will be open when the switch 76 is closed.

Figure 5:
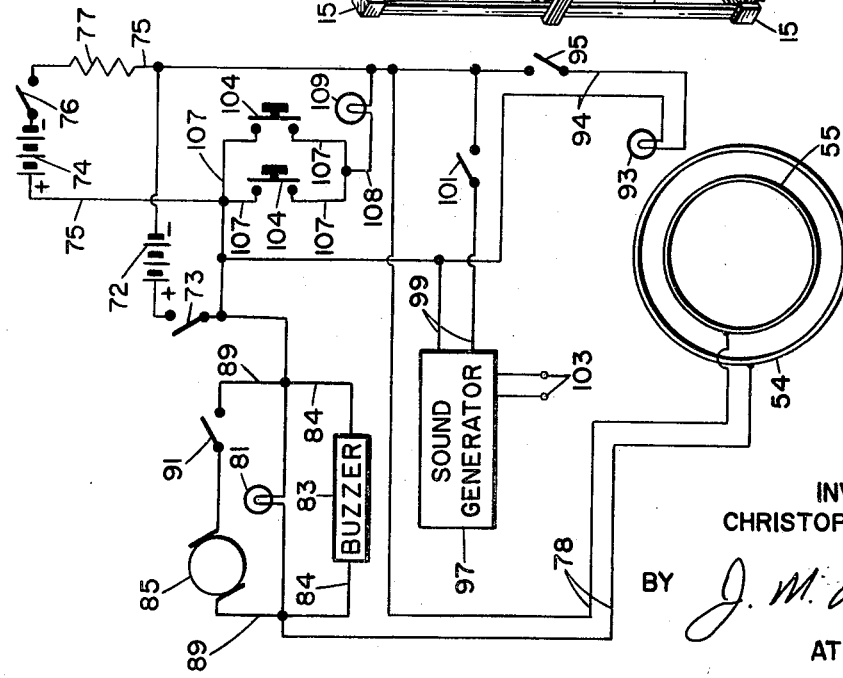

The circuits mentioned hereinbefore include a pair of insulated electrical conductors 78 extending from control box 66 through conduit 67 to the terminus thereof, and thence through another waterproof conduit 79 into housing 53 through a suitable opening formed therein. Conduit 79 should be sealed into the opening through which it enters housing 53 to assure the watertightness thereof. The terminus of one of the conductors 78 within housing 53 is electrically connected to the ring element 54 and the corresponding terminus of the other conductor 78 is electrically connected to the ring element 55. When electrical communication is established between the ring element 54 and the ring element 55 as either of the weights 58 comes into contact therewith, the circuit including the conductors 78 is closed through either the switch 73 or the switch 76, as indicated in FIG. 5, lighting the electrical signal lamp 81 mounted on control box 66, which is connected in series with one of the conductors 78, as well as activating a buzzer 83 mounted within control box 66 and connected in parallel with signal lamp 81 by means of the conductors 84. When the user of the trap 11, with control box 66 at hand, sees the signal lamp 81 light up and/or hears the buzzer 83, he may grasp the pull element 71 and draw cable 49 in his direction, thereby initiating closure of the trap 11 as hereinbefore set forth.

Alternatively, the user of trap 11 may rely upon the operation of an electric motor 85 mounted in a waterproof housing 86 carried by the upper surface of a bed plate 87 mounted upon the upper surface of the upper frame section of trap body assembly 12. The cable 51 connected to the link element 48, as hereinbefore set forth, extends therefrom and enters housing 86, where it is interconnected with the shaft element of motor 85. Operation of the motor 85 draws the cable 51 into the housing 86, moving the link element 48 as hereinbefore set forth to initiate closure of trap 11. A flexible rubber sleeve 88 similar to the sleeves 59 is loosely placed around cable 51 and is secured thereto and to housing 86 to assure the watertightness thereof similarly to the connection of a sleeve 59 to a cable 57 and to the housing 53. The motor 85 is connected in parallel with signal lamp 81 by means of a pair of insulated electrical conductors 89, one of which includes a toggle switch 91 mounted upon control box 66. The conductors 89 extend from the control box 66 through conduit 67 towards the terminus thereof, and thence through another waterproof conduit 92 into the housing 86 similarly to the introduction of the conduit 79 into the housing 53. When the user of trap 11 desires to leave the trap unattended for any reason, he may close the toggle switch 91, which permits operation of the motor 85 when current flows through the conductors 78.

The circuits mentioned hereinbefore also include a waterproof lamp 93 mounted exteriorly on housing 53 adapted to emit a red glow when electrically energized, which has been found attractive to fish and the like which the trap 11 is intended to take. The lamp 93 is connected into the circuit by means of the insulated electrical conductors 94 in parallel with the batteries 72 and 74. One of the conductors 94 includes a toggle switch 95 mounted on the control box 66 to switch the lamp 93 on and off. The conductors 94 extend from control box 66 through conduit 67 and from the terminus thereof through another waterproof conduit 96 to the lamp 93, with which they are connected in waterproof fashion.

The circuits hereinbefore set forth further include means for producing within the trap body assembly 12 a sound considered to be attractive to fish and the like which trap 11 is intended to take. The sound generator, indicated by the block designated by the reference numeral 97 shown in FIG. 5, may simply take the form of a buzzer or the like mounted in a truncated conical horn; the whole being covered by a thin, waterproof plastic sheath 98 or the like and suitably mounted on the lower surface of longitudinal bar 27 of the trap body assembly 12. A sound generator 97 of the simple type set forth hereinbefore could then be connected in parallel with the lamp 93 by means of a pair of insulated electrical conductors 99; one of which includes a toggle switch 101 mounted on control box 66 to switch the sound generator 97 on and off. The conductors 99 extend from control box 66 through conduit 67 towards the terminus thereof, and thence through another waterproof conduit 102 into the sound generator covered by the sheath 98 in waterproof fashion.

A more elaborate sound generator for trap 11 could include a conventional miniature electronic amplifier mounted in control box 66, and the conductors leading therefrom into the waterproof sheath 98 could be connected to a conventional speaker of the permanent magnet type mounted therein. The amplifier so mounted in control box 66 could include conventional jack plugs 103 into which a tape recorder or the like could be plugged, and a tape simulating the natural sound of an insect such as a bee could be played thereon; the sound thereof being reproduced by the speaker enclosed by the waterproof sheath 98.

The circuits set forth hereinbefore also include at least one switch 104 of the push-button type enclosed within a flexible waterproof sheath 105 and mounted in a downwardly facing position on a suitable bracket 106 connected to one of the intermediate end members 21 of trap assembly 12; the switch 104 being so positioned that when the trap door carriage assembly 32 is at the upper limit of the range of travel thereof the upper surface of one of the end bars 36 presses through the sheath 105 against the push-button element of switch 104 to close the same. The switch 104 is connected by means of the insulated electrical conductors 107 and the insulated electrical conductor 108 in parallel with batteries 72 and 74; the conductor 108 including a signal lamp 109 mounted on control box 66. The conductors 107 extend from control box 66 through conduit 67 towards the terminus thereof, and thence through another waterproof conduit 111 for interconnection with switch 104 in waterproof fashion. When the trap 11 closes and thereby normally closes the switch 104, the signal lamp 109 comes on to indicate closure of the trap 11 to the user thereof. Inasmuch as there is some liklihood that the trap door carriage assembly 32 may come to rest at the upper limit of the range of travel thereof in a canted rather than a substantially horizontal attitude, a single push-button switch 104 may fail to close when the trap 11 closes. Accordingly, a second push-button switch 104, not illustrated in FIG. 1 but shown schematically in FIG. 5 of the drawings, may be similarly mounted on the other intermediate end member 21 of trap body assembly 12 and connected in parallel with the first switch 104, thereby increasing the probability that the closure of trap 11 will be indicated by signal lamp 109.

The trap 11 may be readily transported to the location in which it will be used by utilizing the central section of the bar 37 of trap door carriage assembly 32 as a carrying handle. The user may then centrally push downwardly on the central section of bar 37 to move the trap door carriage assembly 32 to the lower limit of its range of travel and, maintaining pressure thereon, may set the link element 48 in the position set forth hereinbefore and shown in FIG. 3 to cause the arm 45 of latch element 44 to overlie the transverse rod 42 and maintain the trap door carriage assembly 32 at the lower limit of its range of travel. The hooks 63 may then be baited and the trap 11 lowered through a body of water to rest on the bed thereof; the conduit 67 serving as a line for this purpose if the strength thereof is deemed adequate. A separate line for this purpose may also be connected to the central section of bar 37 of trap door carriage assembly 32. Either the switch 73 or the switch 76 may then be closed to provide power for operating the electrical components of trap 11. If the user of trap 11 remains by the control box 66 while the trap is in use, and does not desire to utilize the lamp 93, the sound generator 97, or the motor 85, he may close switch 73 to draw power from the battery 72 and dispense with the use of and even the provision of battery 74. However, if more power is required for longer periods the use of the battery 74 is preferred, and switch 76 rather than the switch 73 would be closed in order to draw power therefrom. When a fish or the like attempts to devour the bait carried by one of the hooks 63, the circuit including the conductors 78 will be closed and, the user of trap 11 becoming aware thereof as hereinbefore set forth, would draw upon the cable 49 to close the trap, which would then be indicated by the signal lamp 109. The user of trap 11 would then draw it upwardly through the water, or approach the same if it is utilized on the ground to take animals, and remove the catch therefrom through the trap side door 23; the barbless character of the hooks 63 as hereinbefore set forth eliminating the necessity of extricating the same from the mouth of the fish or animal taken. Should the user of trap 11 desire to leave it unattended for any reason, he may close the switch 91 for operation of the trap trigger mechanism by motor 85, and upon his return could tell if the trap 11 had been sprung by inspection of the signal lamp 109.

The frameworks of the trap body assembly 12 and the trap door carriage assembly 32 could be constructed of any desired structural elements; the disclosure of the use of angle elements for this purpose merely being exemplary. The use of three rather than two springs 28 at each of the ends of the trap 11 is also contemplated, as well as other structural arrangements in the construction thereof.

Obviously, many other modifications and variations of the present invention are possible in the light of the foregoing teachings. It is therefore to be understood that the invention may be practiced otherwise than as specifically described.

What is claimed as new and desired to be secured by Letters Patent of the United States is:

1. A trap adapted to take fish and the like, comprising:
    an enclosure defining a trap body assembly having an open side;
    a trap door section interconnected with said trap body assembly adapted to close said open side thereof;
    resilient means connected between said trap body assembly and said trap door section for normally maintaining said trap door section in a position closing said open side of said trap body assembly;
    a trigger mechanism for said trap including a latch element having a projection moveable between a first position and a second position, said projection when in said second position being adapted to override the action of said resilient means and maintain said trap door section in a position leaving open said open side of said trap body assembly, said trigger mechanism including means interconnected with said latch element releasably positionable to maintain said latch element projection in said second position thereof, said trigger mechanism also including an electrical circuit closing component having a pair of spaced electrically conductive elements, at least one electrically conductive member normally situated in close proximity to said electrically conductive elements but spaced from at least one of said electrically conductive elements, and means for bringing said electrically conductive member into simultaneous contact with both of said electrically conductive elements for establishing electrical communication therebetween when a fish or the like attempts to devour bait placed within said trap;
    electrical circuit means including a first electrical conductor connected between an electrical energy source disposed remotely from said trap and one of said electrically conductive elements and a second electrical conductor connected between said electrical energy source and the other of said electrically conductive elements, said circuit means being capable of being completed when said electrically conductive member simultaneously contacts said electrically conductive elements to establish electrical communication therebetween, said electrical circuit means further including at least a first electrically actuable signal device disposed remotely from said trap and connected in series with one of said conductors, said signal device being actuated when electrical current flows through said conductors; and an elongated flexible element connected to said means interconnected with said latch element releasably positionable to maintain said latch element projection in said second position thereof, said flexible element extending from said trap towards the location of said signal device, said flexible element when drawn upon by the user of said trap stationed at the location of said signal device operating to release said means interconnected with said latch element releaseably positionable to maintain said latch element projection in said second position thereof and thereby permit said projection of said latch element to move from said second position to said first position thereof freeing said trap door section to move into said position closing said open side of said trap body assembly.

2. The trap according to claim 1, wherein an electric motor connected in parallel with said signal device and capable of being switched on and off is mounted on said trap body assembly, and wherein a second elongated flexible element is connected to said means interconnected with said latch element releaseably positionable to maintain said latch element projection in said second position thereof, said second flexible element extending therefrom towards the shaft element of said motor with which it is further interconnected, said motor being operable to draw upon said second flexible element to release said means interconnected with said latch element releaseably positionable to maintain said latch element projection in said second position thereof and thereby permit said projection of said latch element to move from said second position to said first position thereof freeing said trap door section to move into said position closing said open side of said trap body assembly.

3. The trap according to claim 1, wherein a second electrically actuable signal device and at least one push-button switch are connected in series with said electrical energy source, said second signal device being disposed adjacent said first signal device and said push-button switch being so mounted on said trap body assembly that the push-button element thereof is depressed and said push-button switch is closed when said trap door section is in said position closing said open side of said trap body assembly.

4. The trap according to claim 1, wherein an electrically actuable light and an electrically actuable sound generator are mounted within said trap body assembly and electrically connected to said electrical energy source, and including means for separately switching said light and said sound generator on and off.

5. A trap adapted to take fish and the like, comprising:
a trap body assembly having an operationally substantially horizontally disposed upper surface and a plurality of operationally substantially vertically disposed side walls, said upper surface and an upper portion of each of said side walls being covered by a material impenetrable by fish or the like said trap is intended to take;

a trap door carriage assembly interconnected with said trap body assembly for operationally substantially vertical reciprocating movement with respect thereto, said trap door carriage assembly having an operationally substantially horizontally disposed trap door frame section covered by a material impenetrable by fish or the like said trap is intended to take, said trap door frame section being disposed adjacent the lower extremity of said material covering said upper portions of said trap body assembly side walls when said trap door carriage assembly is at the upper limit of the range of substantially vertical travel thereof for completing the enclosure of the volume of space within said trap situated thereabove;

resilient means connected between said trap body assembly and said trap door carriage assembly for normally maintaining said trap door carriage assembly at the upper limit of the range of substantially vertical travel thereof;

a trigger mechanism for said trap including a latch element having an arm moveable between a first position and a second position, said arm when in said second position being adapted to override the action of said resilient means and maintain said trap door carriage assembly substantially at the lower limit of the range of substantially vertical travel thereof, said trigger mechanism further including a link element interconnected with said latch element and positionable to span the gap between a pair of support points for maintaining said latch element arm in said second position thereof, said trigger mechanism also including an electrical circuit closing component having a pair of spaced electrically conductive elements, at least one electrically conductive member normally situated in close proximity to said electrically conductive elements but spaced therefrom, and means for bringing said electrically conductive member into simultaneous contact with said electrically conductive elements for establishing electrical communication therebetween when a fish or the like attempts to devour bait placed within said trap;

electrical circuit means including a first electrical conductor connected between an electrical energy source disposed remotely from said trap and one of said electrically conductive elements and a second electrical conductor connected between said electrical energy source and the other of said electrically conductive elements, said circuit means being capable of becoming completed when said electrically conductive member simultaneously contacts said electrically conductive elements to establish electrical communication therebetween, said electrical circuit means further including at least a first electrically actuable signal device disposed remotely from said trap and connected in series with one of said conductors, said signal device being actuated when electrical current flows through said conductors; and an elongated flexible element connected to said link element and extending from said trap towards the location of said signal device, said flexible element when drawn upon by the user of said trap stationed at the location of said signal device being operable to dislodge said link element from the position in which it spans said gap between said pair of support points and thereby permit said arm of said latch element to move from said second position to said first position thereof freeing said trap door carriage assembly to move substantially vertically upwardly towards the upper limit of the range of travel thereof.

6. The trap according to claim 5, wherein an electrical motor connected in parallel with said signal device and capable of being switched on and off is mounted on said trap body assembly, and wherein a second elongated flexible element is connected to said link element and extends therefrom towards the shaft element of said motor with which it is further interconnected, said motor being operable to draw upon said second flexible element to dislodge said link element from the position in which it spans said gap between said pair of support points permitting said arm of said latch element to move from said second position to said first position thereof freeing said trap door carriage assembly to move substantially vertically upwardly to the upper limit of the range of travel thereof.

7. The trap according to claim 5, wherein a second electrically actuable signal device and at least one push-button switch are connected in series with said electrical energy source, said second signal device being disposed adjacent said first signal device and said push-button switch being so mounted on said trap body assembly that the push-button element thereof is depressed and said push-button switch is closed when said trap door carriage assembly is at the upper limit of the range of substantially vertical travel thereof.

8. The trap according to claim 5, wherein an electrically actuable light and an electrically actuable sound generator are mounted within said trap body assembly and electrically connected to said electrical energy source, and including means for separately switching said light and said sound generator on and off.

9. The trap according to claim 8, wherein an electrical motor connected in parallel with said first signal device and capable of being switched on and off is mounted on said trap body assembly, and wherein a second elongated flexible element is connected to said link element and extends therefrom towards the shaft element of said motor with which it is further interconnected, said motor being operable to draw upon said second flexible element to dislodge said link element from the position in which it spans said gap between said pair of support points permitting said arm of said latch element to move from said second position to said first position thereof freeing said trap door carriage assembly to move substantially vertically upwardly towards the upper limit of the range of travel thereof.

10. The trap according to claim 9, wherein a second electrically actuable signal device and at least one push-button switch are connected in series with said electrical energy source, said second signal device being disposed adjacent said first signal device and said push-button switch being so mounted on said trap body assembly that the push-button element thereof is depressed and said push-button switch is closed when said trap door carriage assembly is at the upper limit of the range of substantially vertical travel thereof.

References Cited

UNITED STATES PATENTS

| | | | |
|---|---|---|---|
| 1,779,300 | 10/1930 | Weatherly | 43—60 |
| 2,586,350 | 2/1952 | Lamb | 43—105 |
| 2,682,130 | 6/1954 | Schumann | 43—62 |

WARNER H. CAMP, Primary Examiner

U.S. Cl. X.R.

43—17, 17.1, 105